US010659874B2

(12) United States Patent
Johnson et al.

(10) Patent No.: US 10,659,874 B2
(45) Date of Patent: May 19, 2020

(54) AUDIO I O HEADSET PLUG AND PLUG DETECTION CIRCUITRY

(71) Applicant: Apple Inc., Cupertino, CA (US)

(72) Inventors: Timothy Johnson, San Jose, CA (US); Achim Pantfoerder, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/829,833

(22) Filed: Dec. 1, 2017

(65) Prior Publication Data

US 2018/0220230 A1  Aug. 2, 2018

Related U.S. Application Data

(63) Continuation of application No. 15/056,850, filed on Feb. 29, 2016, now Pat. No. 9,838,780, which is a
(Continued)

(51) Int. Cl.
*H04M 1/00* (2006.01)
*H04R 3/00* (2006.01)
(Continued)

(52) U.S. Cl.
CPC ............. *H04R 3/00* (2013.01); *H01R 13/703* (2013.01); *H01R 29/00* (2013.01);
(Continued)

(58) Field of Classification Search
CPC ........ H02J 7/0021; H02J 1/102; H02J 7/0016; H02J 7/0047; H02J 3/14; H02J 7/0029;
(Continued)

(56) References Cited

U.S. PATENT DOCUMENTS 3,852,703 A   12/1974  Carney et al.
4,367,907 A   1/1983   Buck
(Continued)

FOREIGN PATENT DOCUMENTS

AU   2003296842 A1   9/2004
CN   2403193 Y        10/2000
(Continued)

OTHER PUBLICATIONS

David Guilherme, et al., "Fully Integrated Headphone Detector", 13th IEEE International Conference on Electronics, Circuits and Systems, 2006. ICECS '06, pp. 280-283, (2006).
(Continued)

*Primary Examiner* — Tu X Nguyen
(74) *Attorney, Agent, or Firm* — Womble Bond Dickinson (US) LLP

(57) ABSTRACT

A single prong, multiple signal conducting plug and plug detection circuitry is provided. The plug may be electrically coupled to a stereo headset including a microphone. The plug may include four signal conducting regions arranged in a predetermined order along the length of the prong. Detection circuitry may be operative to determine whether a microphone type of plug (e.g., a four region plug including a microphone region and two audio regions, or a three region plug including microphone region and only one audio region) or a non-microphone type of plug (e.g., stereo plug) is inserted into the jack of an electronic device (e.g., mobile phone). Detection circuitry may also detect user activated functions performed in response to user activation of one or more switches included with the headset. For example, the headset may include a single switch for performing a function with respect to a microphone (e.g., end-call function).

12 Claims, 17 Drawing Sheets

Related U.S. Application Data continuation of application No. 13/917,432, filed on Jun. 13, 2013, now Pat. No. 9,301,045, which is a continuation of application No. 13/038,172, filed on Mar. 1, 2011, now Pat. No. 8,467,828, which is a continuation of application No. 11/650,132, filed on Jan. 5, 2007, now Pat. No. 7,912,501.

(51) Int. Cl.
| | | |
|---|---|---|
| *H04M 1/725* | (2006.01) | |
| *H01R 13/703* | (2006.01) | |
| *H01R 29/00* | (2006.01) | |
| *H04M 1/60* | (2006.01) | |
| *H04R 1/10* | (2006.01) | |
| *H01R 24/58* | (2011.01) | |
| *H04R 29/00* | (2006.01) | |

(52) U.S. Cl.
CPC ..... *H04M 1/6058* (2013.01); *H04M 1/72527* (2013.01); *H04R 1/1041* (2013.01); *H01R 24/58* (2013.01); *H01R 2201/16* (2013.01); *H04R 29/00* (2013.01)

(58) Field of Classification Search
CPC ............. H01R 2107/00; H01R 13/631; H01R 31/065; H01R 33/18; H01R 43/26; H01R 1/1041; H04L 25/0272; H04R 2499/11; H04R 3/00; H04R 5/04; H04S 2400/01; H04S 3/008; H04S 1/005; H04S 1/007; H04S 7/302; H04S 7/305
USPC .................. 455/575.2, 569.1, 556.1, 557
See application file for complete search history.

(56) References Cited

U.S. PATENT DOCUMENTS

| | | |
|---|---|---|
| 4,392,708 A | 7/1983 | Bailey et al. |
| 4,548,447 A | 10/1985 | Dinsmore |
| 4,658,212 A | 4/1987 | Ozawa et al. |
| 4,758,536 A | 7/1988 | Miller et al. |
| 4,770,639 A | 9/1988 | Lau |
| 4,840,568 A | 6/1989 | Burroughs et al. |
| 4,922,547 A | 5/1990 | Murata |
| 4,954,096 A | 9/1990 | Frank |
| 4,975,087 A | 12/1990 | Williams et al. |
| 5,145,416 A | 9/1992 | Cruise et al. |
| 5,170,327 A | 12/1992 | Burroughs |
| 5,327,131 A * | 7/1994 | Ueno ................ H03M 1/36 327/50 |
| 5,393,249 A | 2/1995 | Morgenstern et al. |
| 5,429,519 A | 7/1995 | Murakami et al. |
| 5,557,653 A | 9/1996 | Paterson et al. |
| 5,596,638 A | 1/1997 | Paterson et al. |
| 5,634,822 A | 6/1997 | Gunell |
| 5,794,163 A | 8/1998 | Paterson et al. |
| 5,831,438 A | 11/1998 | Okura |
| 5,938,478 A | 8/1999 | Werner |
| 6,056,602 A | 5/2000 | Wu |
| 6,069,960 A | 5/2000 | Mizukami et al. |
| 6,116,935 A | 9/2000 | Fukuda |
| 6,122,369 A | 9/2000 | Hwang et al. |
| 6,123,575 A | 9/2000 | Huang et al. |
| 6,195,570 B1 | 2/2001 | Ishida |
| 6,238,249 B1 | 5/2001 | Kuwamura |
| 6,254,282 B1 | 7/2001 | Ishihara et al. |
| 6,397,087 B1 | 5/2002 | Kim et al. |
| 6,422,902 B1 | 7/2002 | Ogren et al. |
| 6,470,197 B1 | 10/2002 | Tuoriniemi et al. |
| 6,594,366 B1 | 7/2003 | Adams |
| 6,615,059 B1 | 9/2003 | Pehrsson et al. |
| 6,618,636 B1 | 9/2003 | Sakai et al. |
| 6,672,906 B1 | 1/2004 | Kimura |
| 6,819,942 B2 | 11/2004 | Aotake et al. |
| 6,835,080 B1 | 12/2004 | Chang |
| 6,855,003 B1 | 2/2005 | Wyant |
| 6,856,046 B1 | 2/2005 | Scarlett et al. |
| 6,859,421 B2 | 2/2005 | Sawabe et al. |
| 6,866,527 B2 | 3/2005 | Potega |
| 6,869,316 B2 | 3/2005 | Hinkle et al. |
| 6,945,803 B2 | 9/2005 | Potega |
| 6,961,591 B2 | 11/2005 | Osano |
| 6,981,887 B1 | 1/2006 | Mese et al. |
| 6,984,990 B2 | 1/2006 | Shin |
| 6,988,905 B2 | 1/2006 | Corey et al. |
| 7,064,720 B2 | 6/2006 | Yoshino |
| 7,083,475 B2 | 8/2006 | Henneberger et al. |
| 7,094,087 B2 | 8/2006 | Larn |
| 7,128,591 B2 | 10/2006 | Tsai |
| 7,150,641 B2 | 12/2006 | Tsai |
| 7,227,958 B2 | 6/2007 | Hsieh |
| 7,234,974 B2 | 6/2007 | Henneberger et al. |
| 7,241,157 B2 | 7/2007 | Zhuang et al. |
| 7,241,179 B2 | 7/2007 | Chennakeshu |
| 7,247,046 B1 | 7/2007 | Wu |
| 7,248,707 B2 | 7/2007 | Peng et al. |
| 7,254,415 B2 | 8/2007 | Okamura |
| 7,316,588 B1 | 1/2008 | Rogers et al. |
| 7,316,589 B1 | 1/2008 | Rogers et al. |
| 7,322,858 B1 | 1/2008 | Rogers et al. |
| 7,340,285 B2 | 3/2008 | Yoshino |
| 7,349,546 B2 | 3/2008 | Ganton |
| 7,361,061 B2 | 4/2008 | Kim |
| 7,373,169 B2 | 5/2008 | Yoshino |
| 7,400,914 B2 | 7/2008 | Schwald |
| 7,450,726 B2 | 11/2008 | Goyal |
| 7,470,153 B2 | 12/2008 | Han et al. |
| 7,493,148 B2 | 2/2009 | Ha et al. |
| 7,495,188 B2 | 2/2009 | Follingstad et al. |
| 7,503,807 B2 | 3/2009 | Martin et al. |
| 7,519,185 B2 | 4/2009 | Liang |
| 7,564,966 B2 | 7/2009 | Sano |
| 7,574,011 B2 | 8/2009 | Meyer et al. |
| 7,643,815 B2 | 1/2010 | Jeong et al. |
| 7,683,974 B2 | 3/2010 | Sun et al. |
| 7,697,697 B2 | 4/2010 | Su et al. |
| 7,720,515 B2 | 5/2010 | Oliveira |
| 7,734,361 B2 | 6/2010 | Murawski et al. |
| 7,783,058 B2 | 8/2010 | Stephan et al. |
| 7,809,144 B2 | 10/2010 | Kanji |
| 7,836,216 B2 | 11/2010 | Kashi et al. |
| 7,856,109 B2 | 12/2010 | Lin et al. |
| 7,871,299 B2 | 1/2011 | Kawasaki et al. |
| 7,912,501 B2 | 3/2011 | Johnson et al. |
| 7,916,875 B2 | 3/2011 | Kanji |
| 7,931,537 B2 | 4/2011 | Filer et al. |
| 2001/0055905 A1 | 12/2001 | Tezuka |
| 2003/0142984 A1 | 7/2003 | Masuda et al. |
| 2004/0037426 A1* | 2/2004 | Chu ................ H04H 20/89 381/22 |
| 2004/0136522 A1 | 7/2004 | Wurtz |
| 2004/0175993 A1 | 9/2004 | Chennakeshu |
| 2005/0078935 A1 | 4/2005 | Sun |
| 2005/0090141 A1 | 4/2005 | Peng et al. |
| 2005/0111670 A1 | 5/2005 | King |
| 2005/0164631 A1 | 7/2005 | Jin |
| 2005/0245289 A1 | 11/2005 | Yoshino |
| 2006/0034465 A1 | 2/2006 | Jeong |
| 2007/0049103 A1 | 3/2007 | Kashi et al. |
| 2007/0098184 A1 | 5/2007 | Ibe |
| 2007/0104332 A1 | 5/2007 | Clemens et al. |
| 2007/0164861 A1* | 7/2007 | Sano ................ H04S 3/008 340/568.4 |
| 2007/0218774 A1 | 9/2007 | Han et al. |
| 2008/0004081 A1 | 1/2008 | Rutkowski |
| 2008/0032737 A1 | 2/2008 | Liu et al. |
| 2008/0130913 A1* | 6/2008 | Kong ................ H04R 5/04 381/92 |
| 2008/0165986 A1 | 7/2008 | Daniels et al. |
| 2008/0166003 A1 | 7/2008 | Hankey et al. |
| 2008/0175402 A1 | 7/2008 | Abe et al. |

(56) References Cited

U.S. PATENT DOCUMENTS

| | | | |
|---|---|---|---|
| 2008/0318629 | A1 | 12/2008 | Inha et al. |
| 2009/0061694 | A1 | 3/2009 | Kawasaki et al. |
| 2010/0029344 | A1 | 2/2010 | Enjalbert |

FOREIGN PATENT DOCUMENTS

| | | | |
|---|---|---|---|
| CN | 1350413 | A | 5/2002 |
| CN | 1369166 | A | 9/2002 |
| CN | 2717061 | Y | 8/2005 |
| EP | 1 145 529 | A2 | 10/2001 |
| EP | 1 199 867 | A1 | 4/2002 |
| EP | 1 599 923 | A1 | 11/2005 |
| HK | 1049753 | A1 | 2/2005 |
| JP | 03-052073 | A | 3/1991 |
| JP | 04-283973 | A | 10/1992 |
| JP | 05-046398 | A | 2/1993 |
| JP | 5-31494 | U | 4/1993 |
| JP | 06-089561 | A | 3/1994 |
| JP | 06-140106 | A | 5/1994 |
| JP | 6-61891 | U | 9/1994 |
| JP | 06-258991 | A | 9/1994 |
| JP | 11-121104 | A | 4/1999 |
| JP | 11-162574 | A | 6/1999 |
| JP | 11-224738 | A | 8/1999 |
| JP | 11-288766 | A | 10/1999 |
| JP | 11-317256 | A | 11/1999 |
| JP | 2000-032339 | A | 1/2000 |
| JP | 2000-058212 | A | 2/2000 |
| JP | 2000-081540 | A | 3/2000 |
| JP | 2000-285996 | A | 10/2000 |
| JP | 2001-169385 | | 6/2001 |
| JP | 2001-238284 | A | 8/2001 |
| JP | 2001-356250 | A | 12/2001 |
| JP | 2001-357940 | A | 12/2001 |
| JP | 2002-033151 | A | 1/2002 |
| JP | 2002-050978 | A | 2/2002 |
| JP | 2002-117948 | A | 4/2002 |
| JP | 2002-152365 | A | 5/2002 |
| JP | 2002-536880 | A | 10/2002 |
| JP | 2002-365493 | A | 12/2002 |
| JP | 3398699 | B2 | 4/2003 |
| JP | 2003-189385 | A | 7/2003 |
| JP | 2003-218795 | A | 7/2003 |
| JP | 2003-218803 | A | 7/2003 |
| JP | 2003-297501 | A | 10/2003 |
| JP | 2003-317883 | A | 11/2003 |
| JP | 2004-056309 | A | 2/2004 |
| JP | 2004-056485 | A | 2/2004 |
| JP | 2004-072554 | A | 3/2004 |
| JP | 2004-328419 | A | 11/2004 |
| JP | 2005-333613 | A | 12/2005 |
| JP | 2006-085828 | A | 3/2006 |
| JP | 2006-514412 | A | 4/2006 |
| JP | 2006-135784 | A | 5/2006 |
| KR | 2002-0010085 | A | 2/2002 |
| KR | 2005-0106525 | A | 11/2005 |
| KR | 2005-0107003 | A | 11/2005 |
| KR | 2006-0045806 | A | 5/2006 |
| TR | 2001 02172 | T2 | 5/2002 |
| TW | 595239 | B | 6/2004 |
| TW | I266551 | B | 11/2006 |
| WO | WO 00/45566 | A2 | 8/2000 |
| WO | WO 2004/079873 | A1 | 9/2004 |
| WO | WO 2008/041064 | A2 | 4/2008 |

OTHER PUBLICATIONS

"Local Connectivity: Wired Analogue Audio", OMTP Limited, Open Mobile Terminal Platform, Version 1.0, 15 pgs., (Apr. 27, 2007).

"STAC9758/59—High-Performance 6-Channel AC97 2.3 CODEC with Universal Jack™", SigmaTel, Inc., Datasheet Revision 1.0, 110 pgs., (2002).

"IEEE P269/D25—Draft Standard Methods for Measuring Transmission Performance of Analog and Digital Telephone Sets, Handsets, and Headsets", Subcommittee on Telephone Instrument Testing of the Transmission, Access and Optical Systems of the IEEE Communications Society, 152 pgs., (Oct. 2004).

"Exhibit 3", Applicant: Motorola, Inc., FCC ID: IHDT56ES1, 1 pg., (date unknown).

"Exhibit 9", Applicant: Motorola, Inc., FCC ID: IHDT56ES1, 3 pgs., (date unknown).

"Exhibit 8—Instruction Manual—MotoManual E790 GSM", Applicant: Motorola, Inc., FCC ID: IHDT56ES1, 99 pgs., (2005).

"Exhibit 3", Applicant: Motorola, Inc., FCC ID: IHDT56FB1, 1 pg., (date unknown).

"Exhibit 9", Applicant: Motorola, Inc., FCC ID: IHDT56FB1, 3 pgs., (date unknown).

"Exhibit 8—Instruction Manual—MotoManual ROKR E2 GSM", Applicant: Motorola, Inc., FCC ID: IHDT56FB1, 104 pgs., (2005).

"Samsung YP-T7J", Samsung Electronics America, Inc., 28 pgs., (date unknown).

"BeoSound 6 Guide", Bang & Olufsen, 12 pgs., (date unknown).

"User's Guide—HP iPAQ Pocket PC h6300 Series", Hewlett-Packard, First Edition, Document Part No. 353283-001, 238 pgs., (Jun. 2004).

"Motorola V300 GSM Wireless Phone—More Here", Motorola, Inc., Manual No. 6809467A28-O, 56 pgs., (2003).

"Motorola V400 GSM Wireless Phone—More Here", Motorola, Inc., Manual No. 6809480A53-O, 56 pgs., (2004).

"Motorola E398 GSM Wireless Phone", Motorola, Inc., 31 pgs., (2003).

"Motorola V600 GSM Wireless Phone—Start Here", Motorola, Inc., Manual No. 6809467A24-A, 132 pgs., (2004).

"Nokia N76—User's Guide", Nokia Corporation, 131 pgs., (2007).

"Nokia N91", Nokia Corporation, 127 pgs., (2006).

"Samsung Player", Samsung Electronics, Inc., Model No. YP-K3, 63 pgs., (date unknown).

"Sony Ericsson K750i", Sony Ericsson Mobile Communications AB, Publication No. EN/LZT 108 7529 R1A, 103 pgs., (Feb. 2005).

"Sony Ericsson K800i", Sony Ericsson Mobile Communications AB, Publication No. EN/LZT 108 8587 R1A, 98 pgs., (2006).

"Sony Ericsson W800i", Sony Ericsson Mobile Communications AB, Publication No. EN/LZT 108 7880 R1A, 44 pgs., (May 2005).

"Motorola V500 GSM Wireless Phone", Motorola, Inc., Manual No. 6881044B70, 99 pgs., (2003).

"XBOX 360—Wireless Headset", Microsoft Corporation, 52 pgs., (2007).

"XBOX 360—vol. 1: Setup—vol. 1: Installation—vol. 1: Configuration", Microsoft Corporation, Part No. X11-42611-01, 13 pgs., (2005).

"XBOX 360—vol. 1: Setup—vol. 1: Installation—vol. 1: Configuration", Microsoft Corporation, Part No. X11-42612-01, 15 pgs., (2005).

"Xbox 360 Controller", Microsoft Corporation, Part No. X11-29953-01, 2 pgs., (2005).

"Xbox 360 Wireless Controller", Microsoft Corporation, Part No. X11-29949-01, 2 pgs., (2005).

PCT Notification concerning Transmittal of International Preliminary Report on Patentability (Chapter I of the Patent Cooperation Treaty) for PCT International Application No. PCT/US2008/000177, 12 pgs., (dated Jul. 16, 2009).

PCT Invitation to Pay Additional Fees and, where applicable, Protest Fee containing Communication relating to the Results of the Partial International Search Report for PCT International Application No. PCT/US2008/000177, 7 pgs., (dated Aug. 12, 2008).

PCT International Search Report and Written Opinion, International Application No. PCT/US2008/000177, International Filing Date—Apr. 1, 2008, 20 pages.

Non-Final Office Action (dated Aug. 5, 2010), U.S. Appl. No. 11/650,132, filed Jan. 5, 2007, First Named Inventor: Timothy Johnson, 11 pages.

Final Office Action (dated Sep. 13, 2010), U.S. Appl. No. 11/650,132, filed Jan. 5, 2007, First Named Inventor: Timothy Johnson, 7 pages.

(56) References Cited

OTHER PUBLICATIONS

SIPO (State Intellectual Property Office of the People's Republic of China) Search Report for Chinese Utility Model Patent No. ZL2008200022034, 15 pgs., (dated Nov. 24, 2011).
Taiwanese Search Report for ROC (Taiwan) Patent Application No. 097100427, 3 pgs., (dated Apr. 11, 2011).
IPod Features Guide, 2006, 72 pages.
Grahm Skee, Microsoft Zune AV Cable Pinouts, Nov. 26, 2006, http://anythingbutipod.com/2006/11/microsoft-zune-av-cable-pinouts/, 2 pages.

* cited by examiner

AUDIO I O HEADSET PLUG AND PLUG DETECTION CIRCUITRY

CROSS REFERENCE TO RELATED APPLICATIONS

This application is a continuation of co-pending U.S. patent application Ser. No. 15/056,850 filed on Feb. 29, 2016, which is a continuation of U.S. patent application Ser. No. 13/917,432 filed on Jun. 13, 2013, now issued as U.S. Pat. No. 9,301,045, which is a continuation of U.S. patent application Ser. No. 13/038,172 filed on Mar. 1, 2011, now issued as U.S. Pat. No. 8,467,828, which is a continuation of U.S. patent application Ser. No. 11/650,132, filed Jan. 5, 2007, now issued as U.S. Pat. No. 7,912,501 and entitled "AUDIO I O HEADSET PLUG AND PLUG DETECTION CIRCUITRY" which is incorporated herein by reference in its entirety.

BACKGROUND OF THE INVENTION

This relates to portable electronic devices, and more particularly to headset plugs and plug detection circuitry.

Portable electronic devices may include jacks or sockets for receiving connector plugs (e.g., stereo plug) for headphones or headsets. Audio signals may be passed from the jack to the headset through electrical connections formed between the plug and the jack when the plug is inserted into the jack. Known jacks include single prong monaural and stereo plugs and double prong stereo plugs. A drawback of such plugs is that they lack the ability to handle additional signals which may be provided by either the headset or the jack. In addition, the double prong plug requires a double prong jack, which may occupy valuable real estate in the media device.

What is needed is a single prong plug capable of handling at least one additional signal in addition to one or more audio signals. What is also needed is plug detection circuitry to detect which type of plug is received in the jack and to detect user activated functions that may be performed with a headset connected to the plug.

SUMMARY OF THE INVENTION

A single prong, multiple signal conducting plug is provided. This plug may be electrically coupled to a stereo headset including a microphone. The plug may include four signal conducting regions arranged in a predetermined order along the length of the prong. As such, this plug may be referred to as a four region plug. The signal conducting regions include a left audio signal region, a right audio signal region, a ground region, and a microphone region, where the ground region is located between the microphone region and either the left or right audio signal regions.

Detection circuitry may be operative to determine whether a microphone type of plug (e.g., a four region plug including a microphone region and two audio regions, or a three region plug including a microphone region and only one audio region) or a non-microphone type of plug (e.g., stereo plug) is inserted into the jack of the electronic device (e.g., mobile phone). The detection circuitry may provide a signal that indicates whether the received plug is a microphone or non-microphone type. For example, when the plug is received, the signal may indicate that a microphone type of plug is received. Detection circuitry may provide another signal that indicates whether a plug is received by the jack. Both signals may be provided to other circuitry, such as a processor, within the electronic device for further processing.

Detection circuitry may also detect user activated functions performed in response to user activation of one or more switches included with the headset. For example, the headset may include a single switch for performing a function with respect to a microphone (e.g., end-call function). When the user presses the switch, the detection circuitry may detect the occurrence of a switch activation event and provide a signal indicative of that activation that switch to other circuitry (e.g., a processor) located in the device. In other embodiments, the headset may include multiple switches (e.g., two switches). The detection circuitry may detect which one of the switches is activated and provide a signal indicative of which switch is activated.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
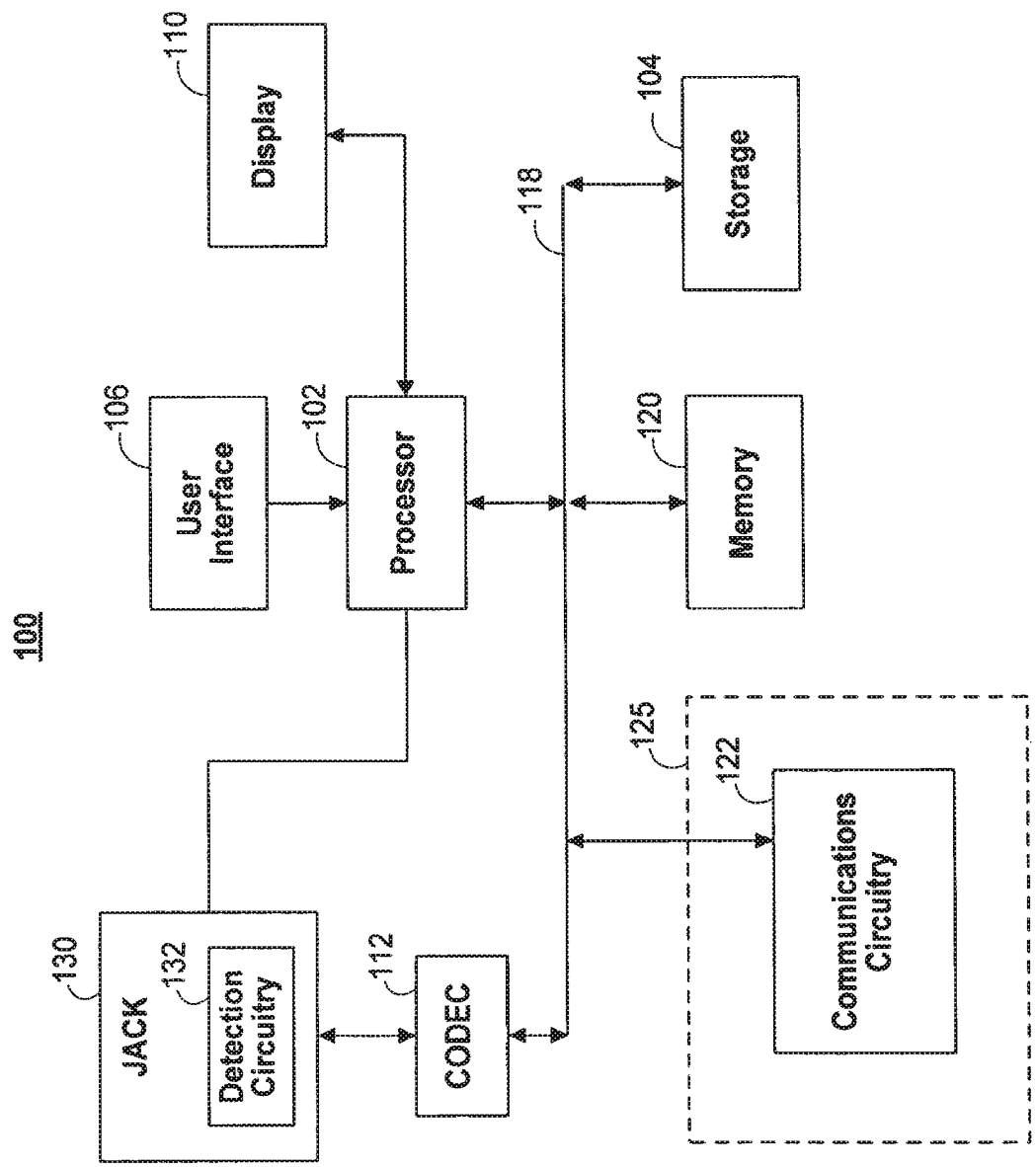
FIG. 1 shows a simplified block diagram of portable media player in accordance with an embodiment of the present invention.

FIG. 1 shows a simplified block diagram of illustrative portable electronic device 100 in accordance with the principles of the present invention. Device 100 may include processor 102, storage device 104, user interface 108, display 110, CODEC 112, bus 118, memory 120, communications circuitry 122, and jack 130. Processor 102 can control the operation of many functions and other circuitry included in media player 100. Processor 102 may drive display 110 and may receive user inputs from user interface 108.

Storage device 104 may store media (e.g., music and video files), software (e.g., for implementing functions on device 100, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that keeps tracks of podcasts or television shows or other media a user subscribes to), telephone information (e.g., telephone numbers), and any other suitable data. Storage device 104 may include one more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory may be provided for store firmware for device applications (e.g., operating system, user interface functions, and processor functions).

Bus 118 may provide a data transfer path for transferring data to, from, or between storage device 104, codec 112, communications circuitry 123, baseband circuitry 124, memory 120, and processor 102.

Coder/decoder (CODEC) 112 may be included to convert digital audio signals into an analog signal, which may be provided to jack 130. For example, CODEC 112 may provide audio signals (e.g., left and right audio signals to jack 130 to be converted into sound by a headset (not shown). In one embodiment, CODEC 112 may provide the left and right audio signals as single ended outputs. CODEC 112 may receive one or more signals from jack 130. For example, jack 130 may receive audio signals from a microphone included with a headset connected to the jack. In one embodiment, CODEC 112 may receive the microphone audio signals as a differential monaural input.

Jack 130 may be constructed to receive single prong plugs of a predetermined length and diameter. For example, jack 130 may receive four region plugs and three region plugs. The plugs may be connected to headsets that may provide microphone and mono or stereo functionality. If desired, the headsets may include integrated switches, that when activated, cause a function to be executed. Examples of headsets that include switches can be found, for example, in commonly assigned Eric Daniels et al. U.S. patent application Ser. No. 11/650,001, filed Jan. 5, 2007, entitled "Bend Switch for Wired Headset," and Evans Hankey et al. U.S. patent application Ser. No. 60/879,155, filed Jan. 6, 2007, entitled "Wired Headset with Integrated Switch," both disclosures of which are hereby incorporated by reference herein in their entireties.

In addition, jack 130 may include detection circuitry 132. Various embodiments of detection circuitry are discussed in more detail below. Jack 130 may be electrically coupled to processor 102 to transmit signals between jack 130 and processor 102. For example, detection circuitry 132 may provide a HEADSET DETECT signal and MIC signal to processor 102. The MIC signal may indicated the presence of headset having a microphone connected to jack 130 and may indicate when a microphone switch is activated. Processor 102 may interpret the signals received from detection circuitry 132 to determine, for example, which plug type is connected to jack 130 and whether a microphone switch is activated. In other embodiments, detection circuitry 132 may provide three or more signals to processor 102. For example, when a headset includes two or more switch functions, a signal conducting pathway may be need for each switch function, where one of the pathways may also be used to indicate to processor 102 whether a four region plug is inserted into jack 130.

Communications circuitry 122 may be included in a carrier circuitry portion (delimited by dashed lines 125) of device 100. Carrier circuitry portion 125 may be dedicated primarily to processing telephone functions and other wireless communications (e.g., Wi-Fi or Bluetooth). For example, baseband circuitry 124 may handle telephone functions. It is understood that the carrier circuitry portion operate independent of other device components operating in device 100. That is, carrier circuitry may be an independently operating subsystem within device 100 that may communicate with other components within device 100.

User interface 108 may allow a user to interact with the device 100. For example, the user input device 108 can take a variety of forms, such as a button, keypad, dial, a click wheel, or a touch screen. Communications circuitry 122 may include circuitry for wireless communication (e.g., short-range and/or long range communication). For example, the wireless communication circuitry may be wi-fi enabling circuitry that permits wireless communication according to one of the 802.11 standards or a private network. Other wireless network protocols standards could also be used, either in alternative to the identified protocols or in addition to the identified protocol. Another network standard may be Bluetooth.

Communications circuitry 122 may also include circuitry that enables device 100 to be electrically coupled to another device (e.g., a computer or an accessory device) and communicate with that other device. As indicated above, communications circuitry 122 may also include baseband circuitry for performing relatively long-range communications (e.g., telephone communications). If desired, communications circuitry 122 may include circuitry for supporting both relatively long-range and short-range communications. For example, communications circuitry 122 may support telephone, Wi-Fi, and Bluetooth communications.

In one embodiment, device 100 may be a portable computing device dedicated to processing media such as audio and video. For example, device 100 may be a media player (e.g., MP3 player), a game player, a remote controller, a portable communication device, a remote ordering interface, an audio tour player, a mobile telephone, or other suitable personal device. In another embodiment, media player 100 may be a portable device dedicated to providing media processing and telephone functionality in single integrated unit. Media player 100 may be battery-operated and highly portable so as to allow a user to listen to music, play games or video, record video or take pictures, place and take telephone calls, communicate with others, control other devices, and any combination thereof. In addition, device 100 may be sized such that it fits relatively easily into a pocket or hand of the user. By being handheld, device 100 is relatively small and easily handled and utilized by its user and thus may be taken practically anywhere the user travels.

Figure 2:
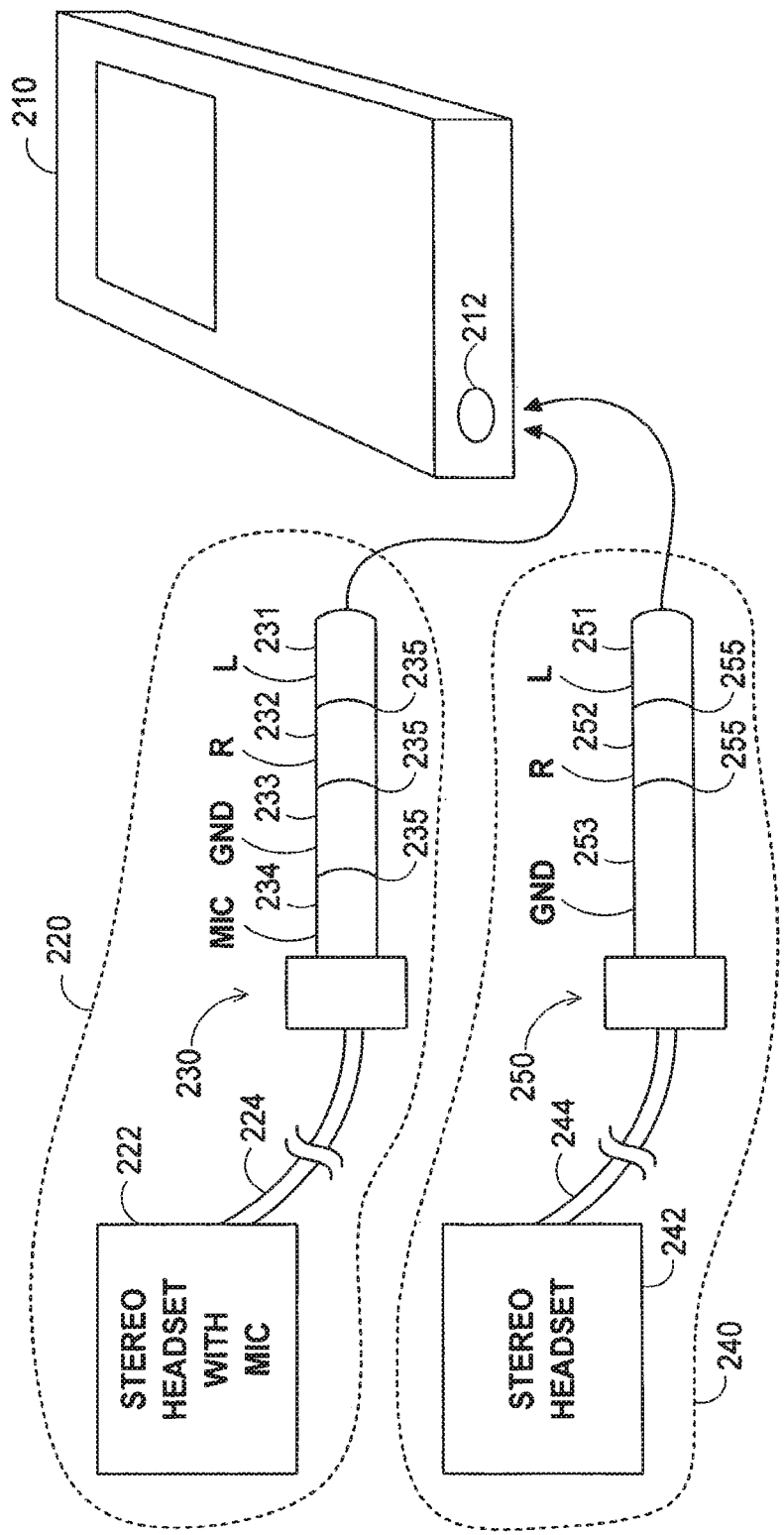
FIG. 2 shows an illustrative personal media device capable of receiving two different types of plugs in accordance with an embodiment of the present invention.

FIG. 2 shows an illustrative portable electronic device 210 capable of receiving two different types of plugs. As shown, plug 230 of headset system 220 and plug 250 of headphone system 240 may be inserted into jack 212. Headset system 220 can include stereo headset with a microphone 224 which is connected to four region plug 230 via wired link 224. Stereo headset with a microphone 224 may include left and right speakers and a microphone.

Plug 230 may include four signal conducting regions arranged in a predetermined order along the length of a single prong. As shown, plug 230 includes, starting from the tip of plug 230, a left audio signal region 231, a right audio signal region 232, a ground region 233, and a microphone region 234. The left and right audio signal regions may be interchanged, however, in this embodiment, ground region is located between the microphone region and the right audio signal region. The regions may be separated by insulating rings 235 that electrically isolate the regions from each other. The electrical connection of headset system 220 is discussed below in more detail in connection with FIG. 3 and a more detailed of four region plug is discussed below in connection with FIG. 4.

Headphone system 240 can include stereo headset 242 which is connected to plug 250 via wired link 244. Stereo headset 242 may include left and right speakers. Plug 250 includes, starting from the tip, a left audio signal region 251, a right audio signal region 252, and a ground region 253. The location of left and right audio regions 251 and 252 may be switched. The regions may be isolated from each by insulating rings 255.

Figure 3:
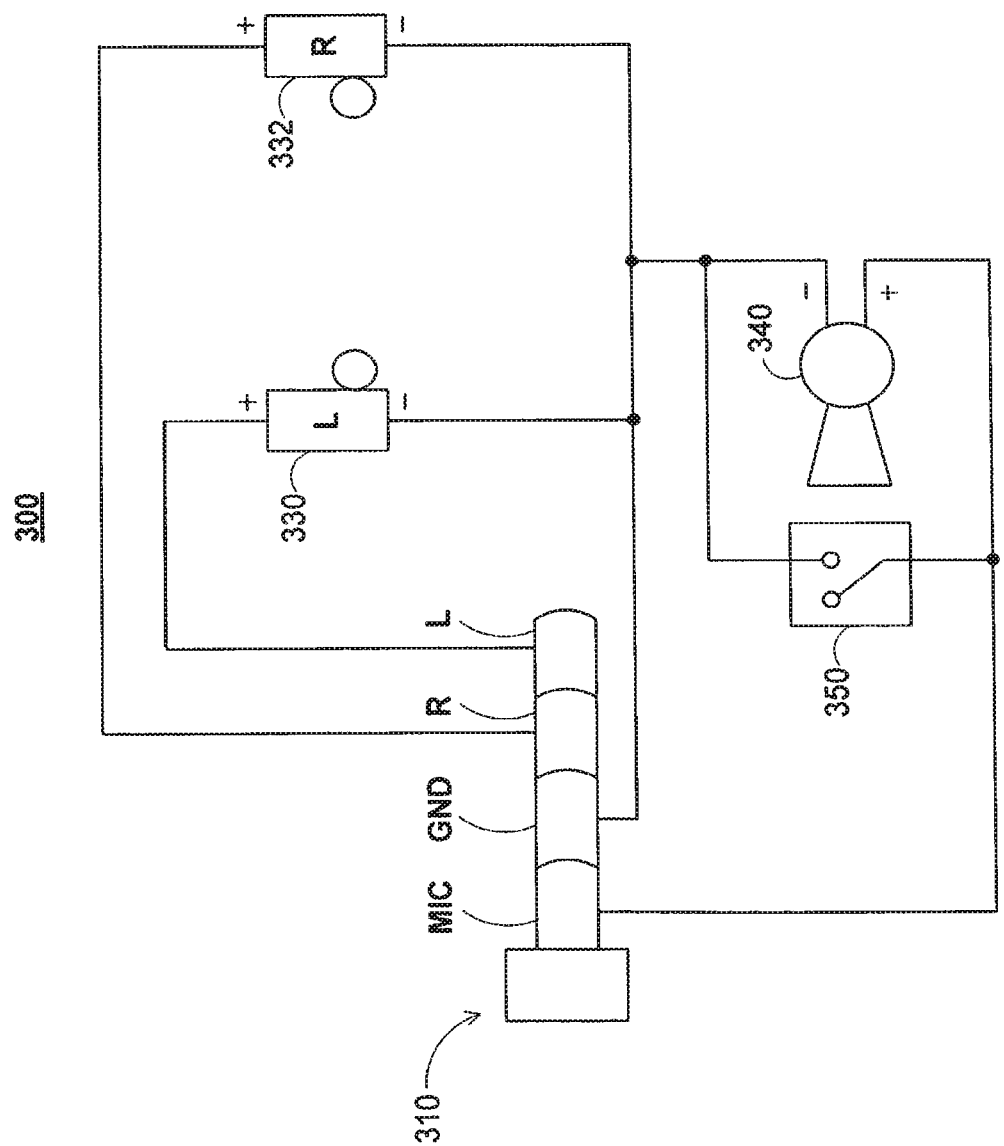
FIG. 3 is a simplified schematic diagram of headset system including stereo headphones, a microphone, and a four region plug in accordance with an embodiment of the present invention.

FIG. 3 is an illustrative simplified schematic diagram of headset system 300 including stereo headphones, a microphone, and a four region plug. FIG. 3 shows how the regions of plug 310 electrically connect to the left and right acoustic elements 330 and 332 (e.g., speakers), and microphone 340. As shown, the left audio signal region, the right audio signal region, and microphone region can be connected to the positive terminals of left acoustic element 330, right acoustic element 332, and microphone 340, respectively. The ground region can be connected to the negative terminals of left acoustic element 330, right acoustic element 332, and microphone 340, respectively.

Headset system 300 may include a switch 350, for example, to enable a user to activate a function with respect to the microphone. Switch 350 may be connected to the microphone and ground regions of plug 310. Switch 350 may be a normally OPEN switch, meaning that in its normal state, microphone 340 is permitted to transmit signals to the microphone portion of plug 310. When switch 350 is CLOSED, microphone 340 is shorted.

Figure 4:
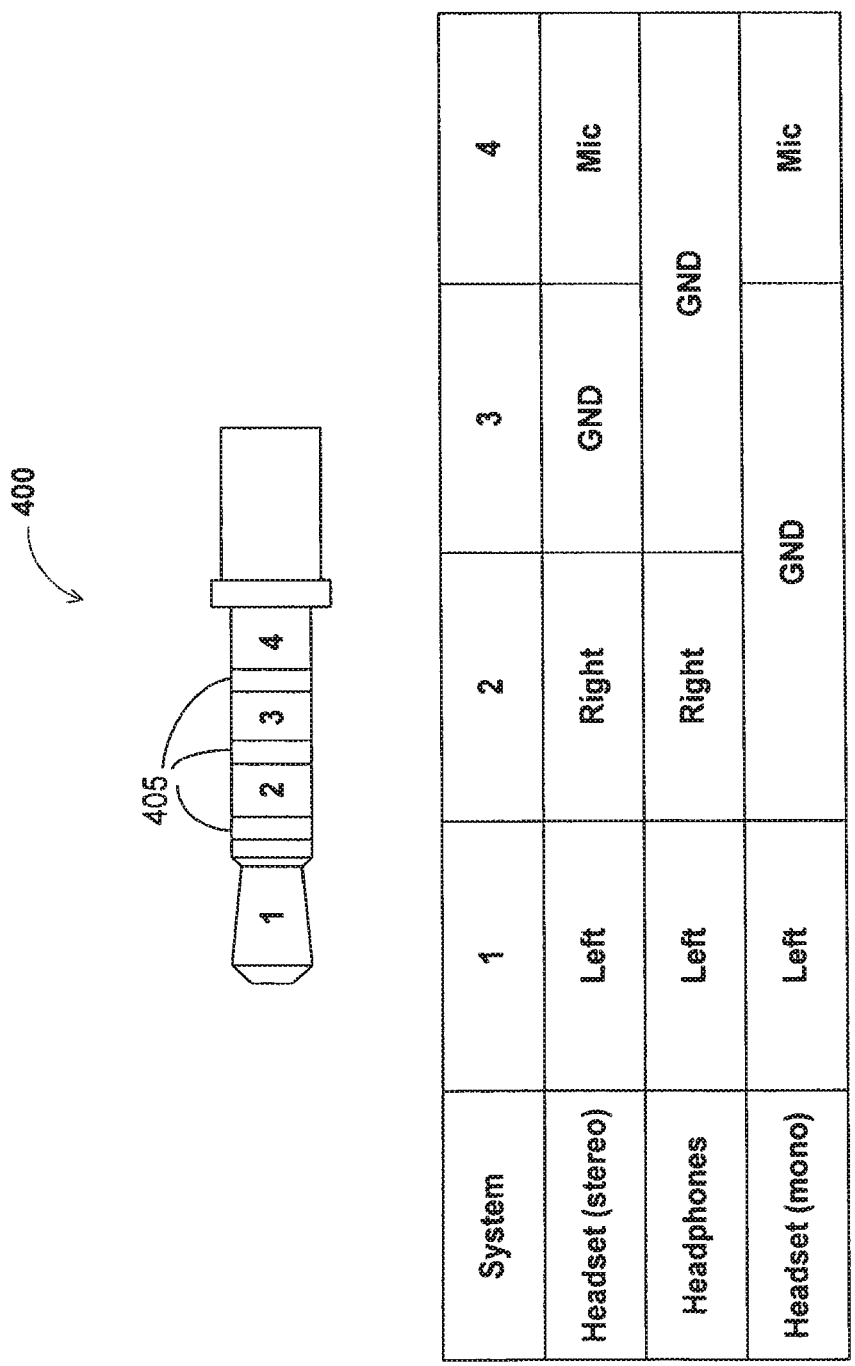
FIG. 4 shows a more detailed yet simplified view of a four region plug in accordance with an embodiment of the present invention.

FIG. 4 shows a more detailed yet illustrative simplified view of a four region plug 400. Plug 400 includes four regions, delineated by the numbers 1-4, separated by insulating rings 405. Plug 400 may be a 3.5 mm plug, where the outer diameter of regions 2-4 is 3.5 mm. Depending on which headset or headphone system plug 400 is connected to, the regions may be used for different signal conducting purposes. The table accompanying FIG. 4 shows the signal conducting purpose of each region for several different systems. For example, for a monaural headset, region 1 may be used for a speaker, regions 2 and 3 may be used as ground, and region 4 may be used for a microphone. Note that for the headset, regions 3 and 4 may be combined to form a single region (not separated by an insulating ring), thereby providing a three-region plug. Further note that for the monaural headset, regions 2 and 3 may be combined to form a single region, providing a three-region plug with a ground region between a microphone region and an audio signal region. Alternatively, in the monaural headset, region 2 may exist but may not connect to, for example, a speaker in the headset and region three may be dedicated to ground.

Figure 5:
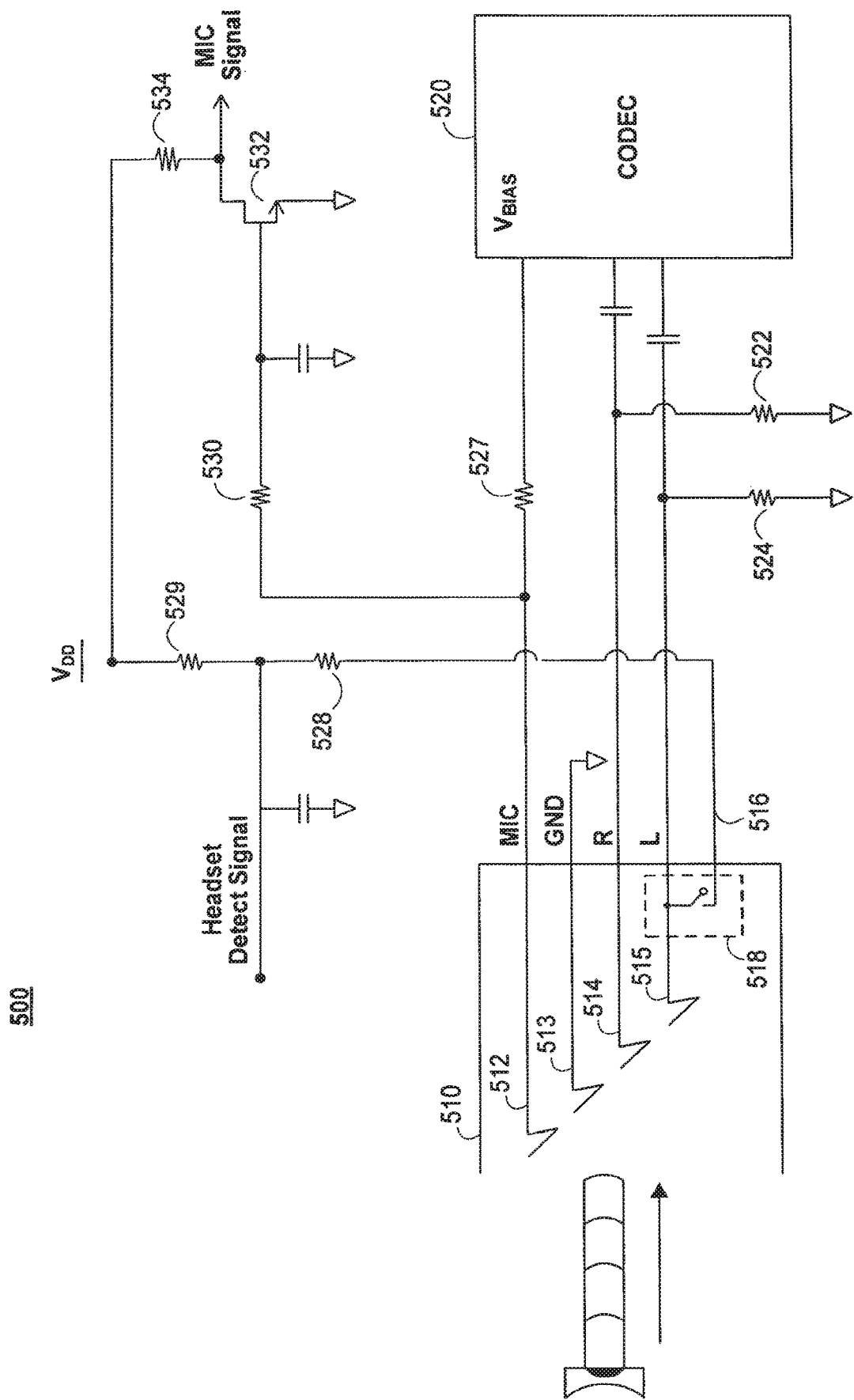
FIG. 5 shows a schematic diagram of detection circuitry in accordance with an embodiment of the present invention.

FIG. 5 shows an illustrative schematic diagram of detection circuitry 500. Detection circuitry 500 may be operative to determine whether a microphone type of plug (e.g., a four region plug including a microphone region and two audio regions, or a three region plug including microphone region and only one audio region) or a non-microphone type of plug (e.g., stereo plug) is inserted into the jack of the electronic device (e.g., mobile phone). The detection circuitry may provide a MIC signal that indicates whether the received plug is a microphone or non-microphone type. For example, when the plug is received, a LOW MIC signal may indicate that a microphone type of plug is received. Detection circuitry 500 may also provide a HEADSET DETECT signal that indicates whether a plug is received by the jack. The MIC and HEADSET DETECT signals may be provided to other circuitry, such as a processor, with the electronic device for further processing by that other circuitry.

Circuitry 500 includes jack 510 for receiving a plug (e.g., a four region plug). Jack 510 includes MIC connector 512, GND connector 513, right connector 514, left connector 515, and headset detect connector 516. Connectors 512-515 are staggered such that each connector contacts a different region of a plug inserted into jack 510. For example, assuming plug 230 of FIG. 2 is inserted into jack 510, microphone region 234 contacts MIC connector 512, ground region 233 contacts GND connector 513, right region 232 contacts right connector 514, and left region 231 contacts left connector 515.

Connectors 512-515 may be arranged in a particular order to ensure desired jack connector to plug regions contacts are made and to ensure that detection circuitry 500 is able to correctly determine which type of headset (e.g., headset with or without microphone) is connected to jack 510. The arrangement of connectors 512-515 can match that of a four region plug according to the invention. That is, GND connector 513 may be located between MIC connector 512 and right connector 514. In another embodiment, GND connector 513 maybe located between MIC connector 512 and left connector 515.

MIC connector 512 may be electrically coupled to CODEC circuitry 520 via bias resistor 527 and transistor 532 (e.g., a FET) via resistor 530. GND connector 512 may be connected to a ground source. Right and left connectors 514 and 515 may be electrically connected to CODEC circuitry 520. In addition, right and left connectors 514 and 515 may be electrically connected to ground via resistors 522 and 524, respectively. Headset connector 516 may be electrically connected to a power source, called Vdd, via resistors 528 and 529. Vdd may also be connected to a terminal of transistor 532 via resistor 534.

Left connector 515 and headset detect connector 516 may be selectively connected together by a normally closed switch 518. Switch 518 may be CLOSED when no plug is inserted into jack 510. When CLOSED, Vcc is pulled to ground through resistor 522. Thus, when switch 518 is CLOSED, the HEADSET DETECT signal, which may be provided to a processor (e.g., processor 102 of FIG. 1), is LOW. A LOW HEADSET DETECT signal may indicate that no plug is inserted in jack 510. A HIGH HEADSET DETECT signal may indicate that a plug is inserted in jack 510. The HEADSET DETECT signal may go HIGH when a plug is inserted into jack 510, the plug causes switch 518 to OPEN. When switch 518 is OPEN, headset detect connector 516 can be pulled up to Vdd.

Detection circuitry 500 may provide a MIC signal, for example, to a processor (e.g., processor 102 of FIG. 1). The state of the MIC signal may indicate whether a headset with a microphone is connected to jack 510. In addition, if a microphone headset is connected to jack 510, changes in the state of the MIC signal may indicate the occurrence of a switch activation (e.g., a user presses a switch to end a telephone call).

MIC signal may be HIGH when transistor 532 is OFF and LOW when transistor 532 is ON. Transistor 532 may be an NMOS transistor. CODEC 520 may bias the gate of transistor 532 so that it is turned ON when a plug is absent from jack 510 and when a plug including a microphone region is inserted into jack 510.

Figure 6:
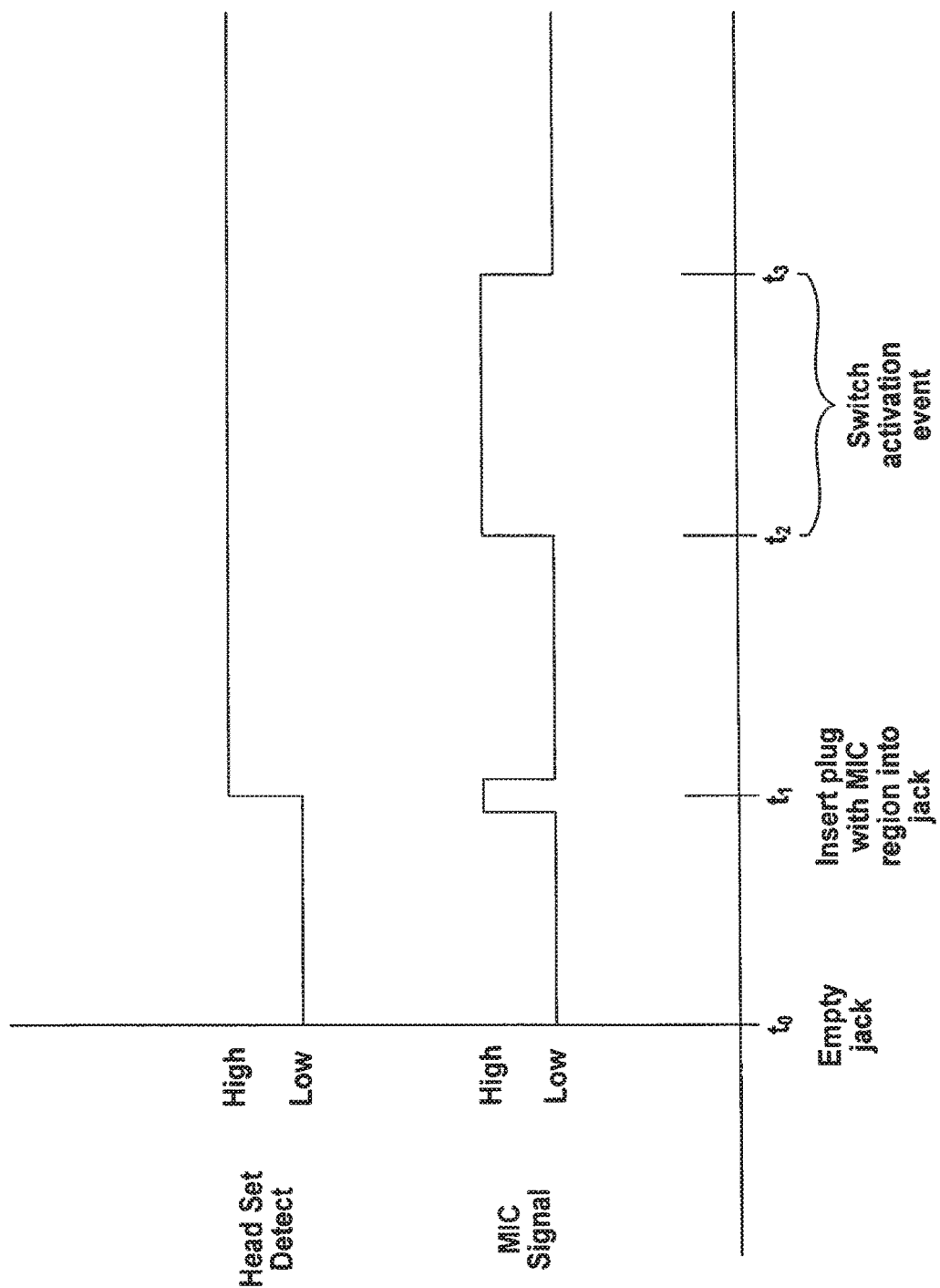
FIG. 6 is an exemplary timing diagram showing the state of the signals provided by detection circuitry in accordance with an embodiment of the present invention.

The operation of detection circuitry 500 is now discussed in combination with FIG. 6, which is an exemplary timing diagram showing the state of the HEADSET DETECT and MIC signals in accordance with an embodiment of the present invention. Starting at time t0, when jack 510 is empty, the both the HEADSET DETECT and MIC signals are LOW. HEADSET DETECT may be LOW because switch 518 is CLOSED, effectively tying connector 516 to ground. MIC signal may be low because CODEC circuitry 520 is biasing transistor 532 to be turned ON, pulling MIC signal to ground.

At time t1, when a plug with a microphone region is inserted into jack 510, HEADSET DETECT signal goes HIGH and MIC signal may pulse HIGH due to shorting of wire contacts during plug insertion, but goes LOW. The processor may be configured to ignore any MIC signal until at least a predetermined period of time after HEADSET DETECT goes HIGH to avoid erroneous detection. HEADSET DETECT signal may go HIGH because switch 518 OPENS in response to jack 510 receiving a plug. MIC signal may continue to stay LOW because transistor 532 is still biased to be turned ON (by CODEC circuitry 520).

Between times t2 and t3, a switch activation event occurs. During this event, MIC signal goes HIGH because transistor 532 is turned OFF. Transistor 532 may be turned OFF when MIC connector 512 is shorted to ground through resistor 524. For example, MIC connector 512 may be shorted when a switch such as switch 350 of FIG. 3 is CLOSED. When shorted, the voltage, including a bias voltage provided by CODEC 520, on connector 512 drops below a threshold voltage on transistor 532, thereby causing transistor 532 to turn OFF. When transistor 532 is turned OFF, the MIC signal is pulled to Vdd via resistor 534. After time t3, the switch activation event ends, at which point transistor 532 turns back ON, pulling the MIC signal down to ground.

Figure 7:
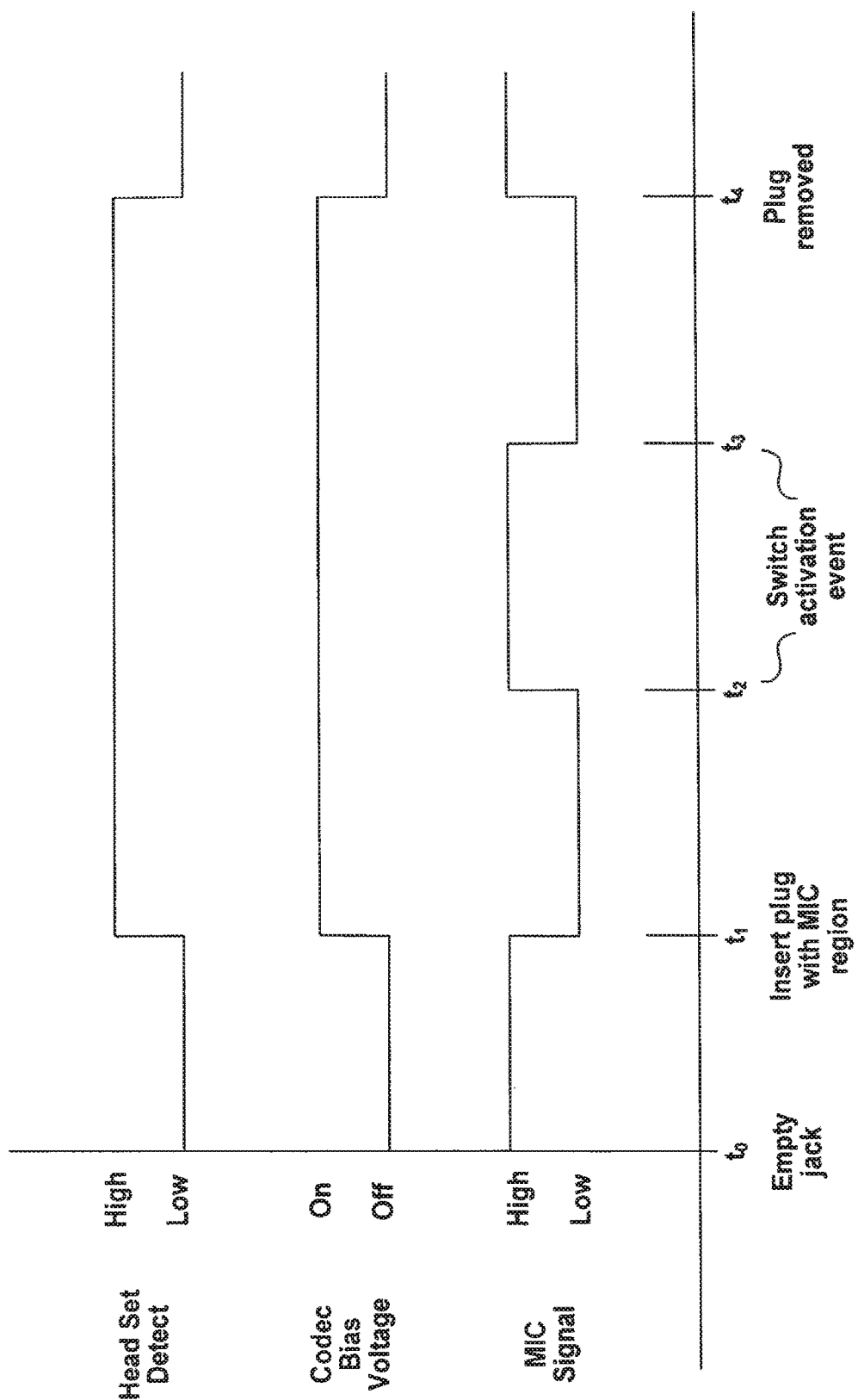
FIG. 7 shows another exemplary timing diagram illustrating operation of detection circuitry using power management in accordance with an embodiment of the present invention.

FIG. 7 shows another exemplary timing diagram illustrating operation of headset detection circuitry 500 using power management in accordance with the principles of the present invention. Using power management, CODEC circuitry 520 may provide a bias voltage only when a plug is inserted into jack 510. Starting at time t0 (an empty jack 510), HEADSET DETECT signal is LOW, which may prevent CODEC circuitry 520 from supplying a bias voltage, thus providing power savings. MIC signal is HIGH because no bias voltage is provided to turn transistor 532 ON. At time t1, when a plug with a microphone region is inserted into jack 510, HEADSET DETECT goes HIGH, which may cause CODEC circuitry 520 to provide a bias voltage that turns transistor 532 ON, pulling MIC signal LOW. Between times t2 and t3, a switch activation event occurs, during which MIC signal is HIGH. At time t4, the plug is removed, causing HEADSET DETECT signal to go LOW. This causes CODEC circuitry 520 to cease supplying a bias voltage and MIC signal goes HIGH.

With respect to FIGS. 6 and 7, a processor may determine whether the type of plug inserted into jack 510 is a plug having a microphone region by checking the state of the MIC signal a predetermined time after the HEADSET DETECT signal goes HIGH. In both FIGS. 6 and 7, the MIC signal is LOW a predetermined time (e.g., 10 ms) after HEADSET DETECT goes HIGH, thus indicating that a microphone is present.

Figure 8:
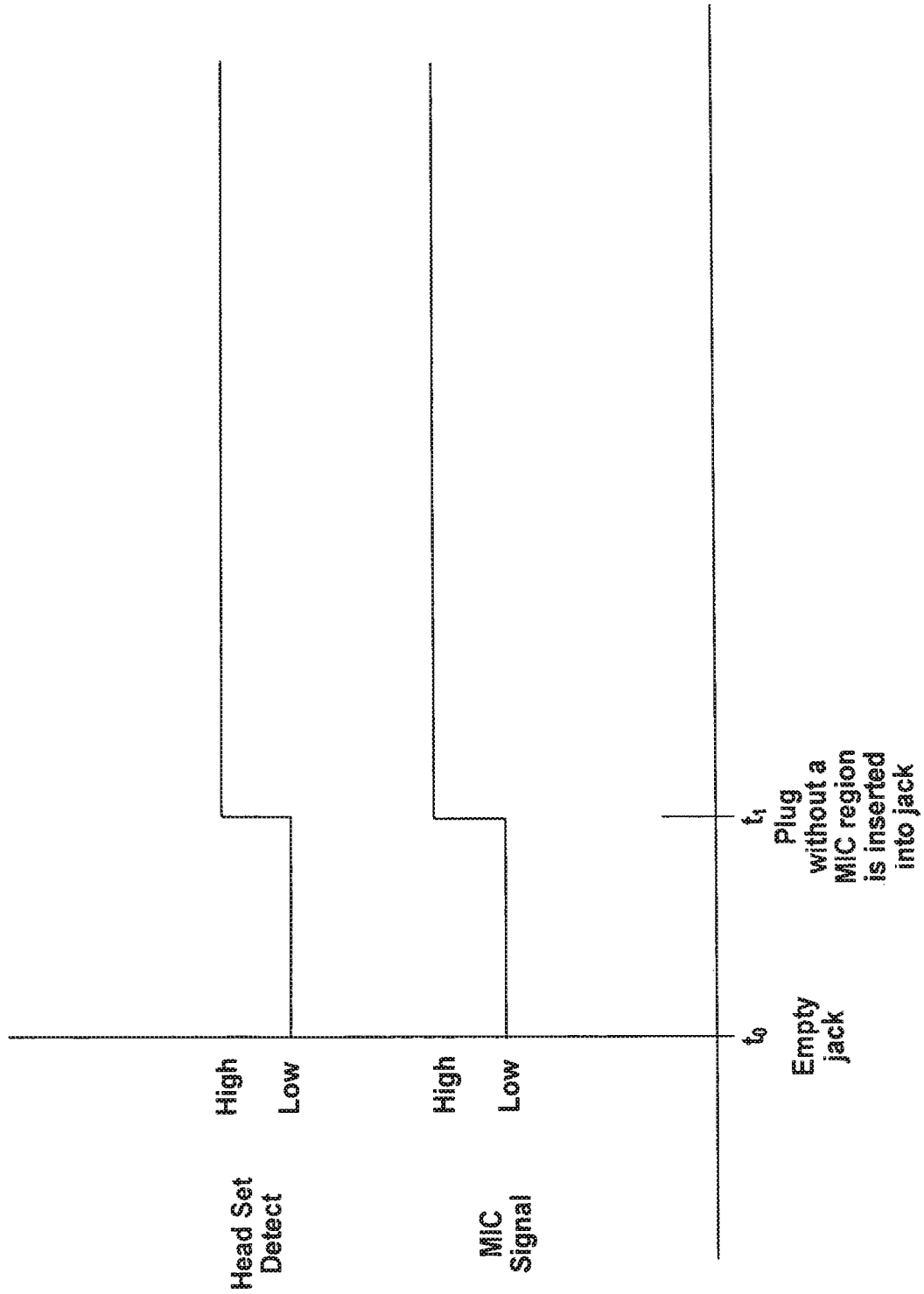
FIG. 8 illustrates an exemplary timing diagram when a plug that does not have a microphone region is inserted into jack 510 in accordance with an embodiment of the present invention.

FIG. 8 illustrates an exemplary timing diagram when a plug that does not have a microphone region is inserted into jack 510. Starting at step t0, when no plug is inserted into jack 510, both HEADSET DETECT and MIC are LOW. At time t1, when a plug with a MIC region is inserted into jack 510, both HEADSET DETECT and MIC go HIGH. MIC may go HIGH because the MIC connector 512 is tied to ground, effectively pulling the gate of transistor 532 to ground, turning it OFF. MIC connector 512 may be coupled to ground connector 513 by a ground region of the plug. For example, assuming that plug 250 of FIG. 2 is inserted into jack 510, ground region 255 may electrically couple MIC connector 512 to ground connector 513.

Figure 9:
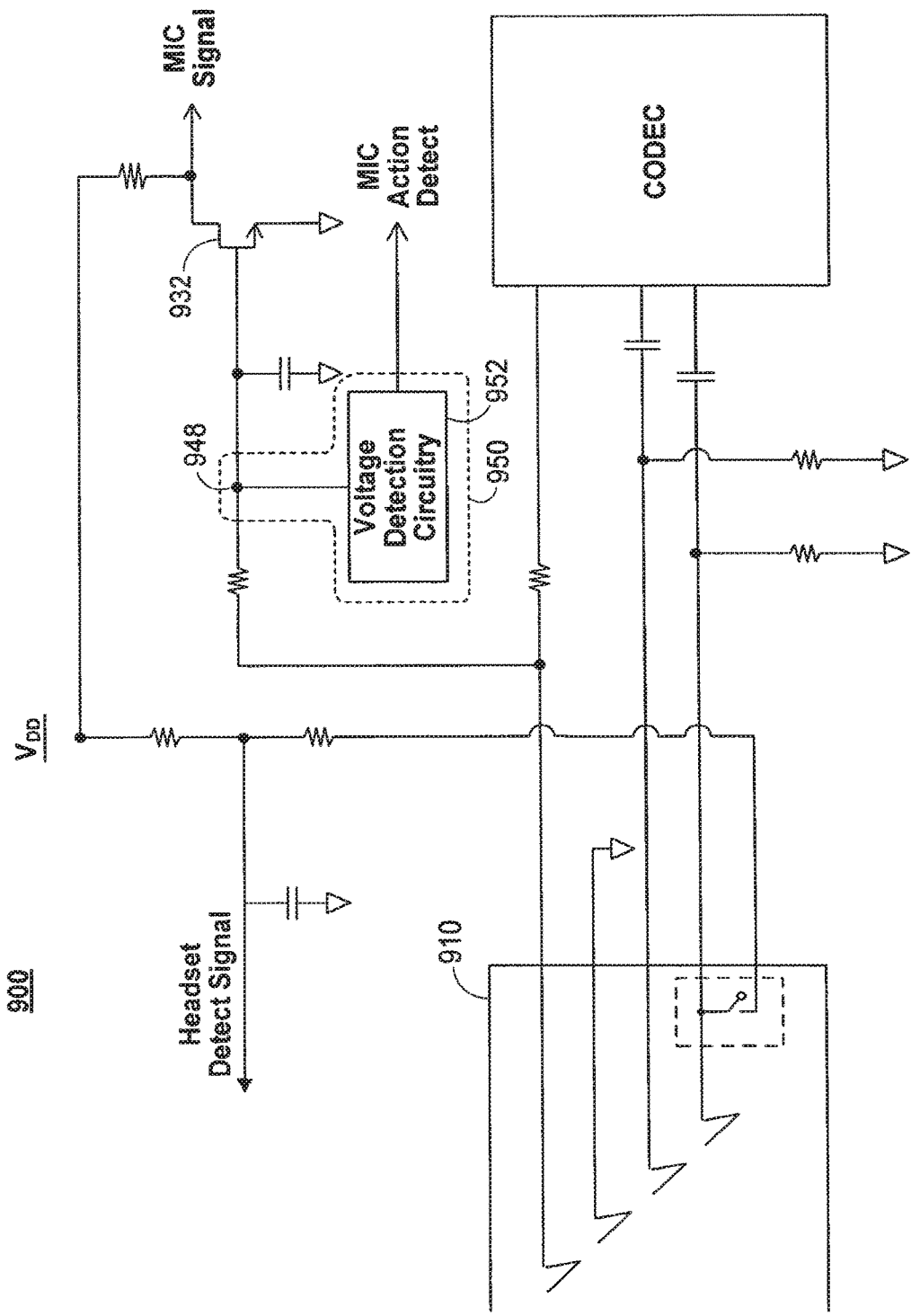
FIG. 9 shows a schematic diagram of detection circuitry including secondary switch detection circuitry according to an embodiment of the present invention.
Figure 13:
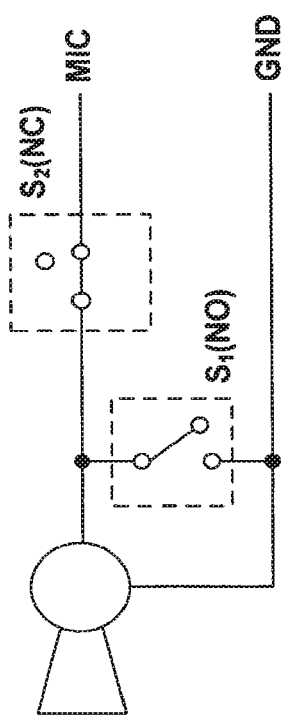
FIGS. 13 and 14 show two illustrative examples of dual switch configurations that may be implemented with respect to a microphone in accordance with a embodiments of the present invention.
Figure 14:
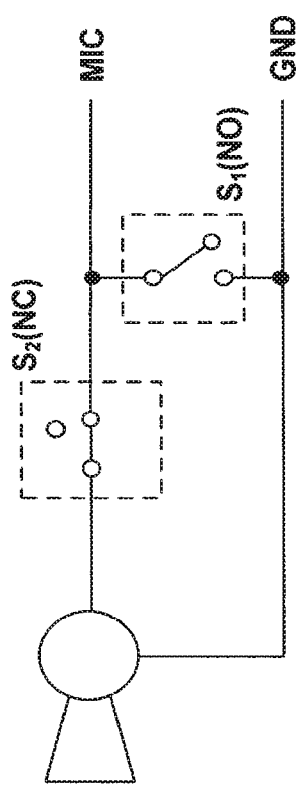

FIG. 9 shows a schematic diagram of detection circuitry 900 including secondary switch detection circuitry 950. Detection circuitry 900 may be the same as detection circuitry 500, therefore a detailed discussion of all the components and operation of circuitry 900 is not needed. Secondary switch detection circuitry 950 may be included for detecting switch activation events of headsets including multiple switches. For example, a headset may include two switches, where activation of each switch may perform a different function, and where simultaneous activation of both switches may perform yet another function. FIGS. 13 and 14 show two illustrative examples of dual switch configurations that may be implemented with respect to a microphone. FIGS. 13 and 14 show a normally closed switch connected in series with the MIC region of a plug (not shown) and a normally open switch connected in parallel with the MIC region of the plug. The tables accompanying FIGS. 13 and 14 show which switch is activated, if any, depending on the open and close positions of switches S1 and S2. The table also indicates whether an MIC OPEN event (e.g., an event in which the MIC is electrically disconnected from the jack) or MIC SHORT event (e.g., an event in which the MIC is short circuited to ground. A normal action may occur when switches S1 and S2 are in their normal positions.

Referring back to FIG. 9, secondary switch detection circuitry 950 may monitor a voltage level to determine the occurrence of switch activation events. Detection circuitry 950 may include voltage detection circuitry 952 electrically coupled to node 948. Voltage detection circuitry 952 provide a HIGH or LOW signal, labeled MIC ACTION DETECT, depending on the voltage seen at node 948. In one embodiment, the voltage detection circuitry may include a comparator that compares to the voltage at node 948 to a reference voltage. The voltage at node 948 may vary among several different voltage levels. For example, node 948 may see a no plug present voltage, a first switch activation voltage, a second switch activation voltage, a combined first and second switch activation voltage, and a normal operating voltage. Depending on the voltage seen at node 948, detection circuitry 900 provides the appropriate signals for MIC and MIC ACTION DETECT.

Figure 10:
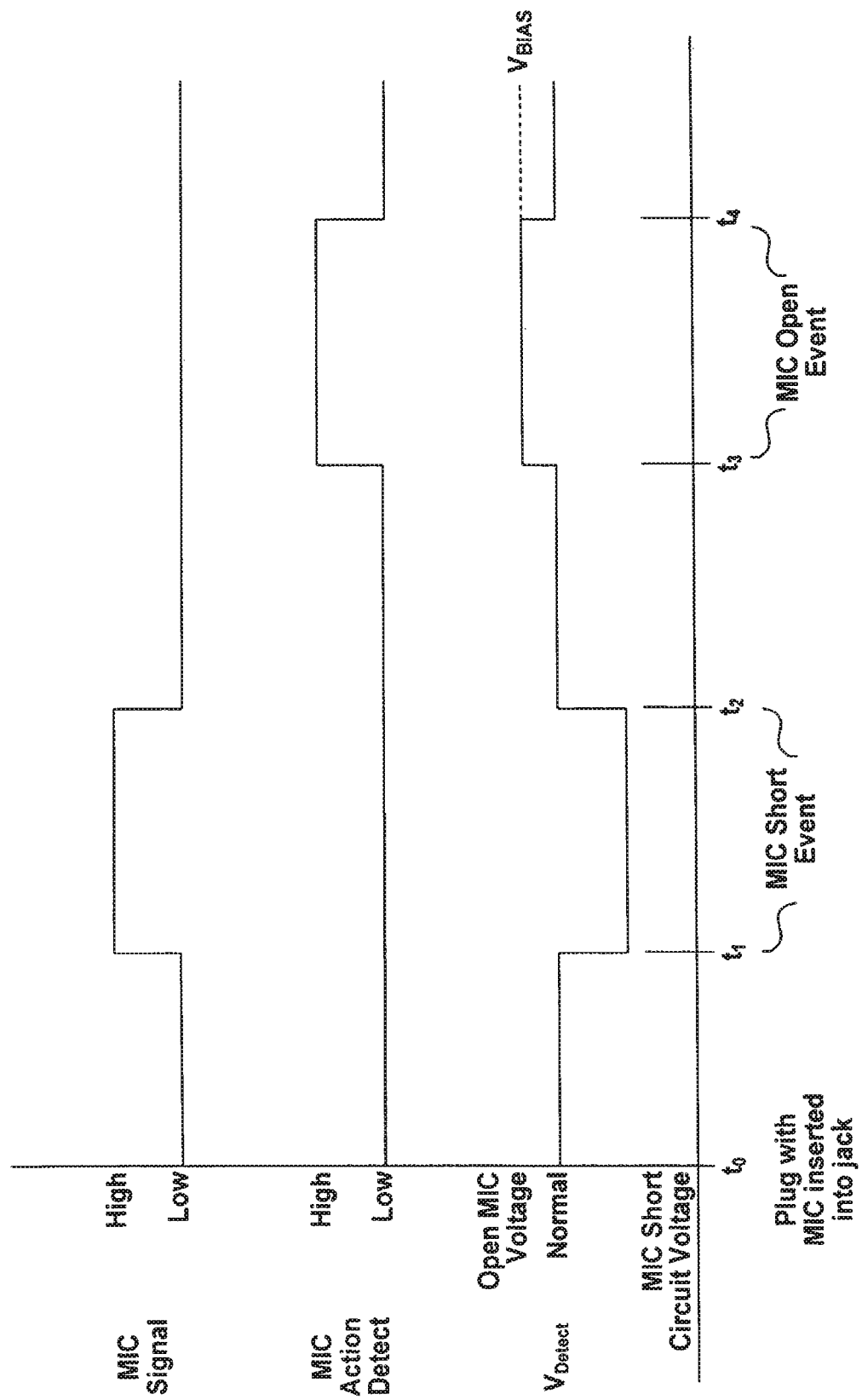
FIG. 10 shows an exemplary timing diagram.

FIG. 10 shows an exemplary timing diagram illustrating assertion of signals based on detected voltage levels using detection circuitry 900 operating in connection with a dual switch, such as those shown in FIGS. 13 and 14. FIG. 10 shows the state of the MIC and MIC ACTION DETECT signals and the voltage detected at node 948, labeled VDETECT. The detected voltage may range from an OPEN MIC voltage to a normal voltage to a MIC short circuit voltage. A normal voltage may be detected when a plug with a microphone is inserted into jack 910 and the microphone is operating in a normal mode (e.g., no switches are being activated), as indicated at time t0. The normal voltage may be the voltage produced when the CODEC circuitry biases the microphone and the transistor 932. Between times t1 and t2, a MIC short circuit event occurs. During the MIC short circuit event, MIC signal goes HIGH and VDETECT goes to the MIC short circuit voltage (or ground). Also, during the MIC short circuit event, the bias voltage is driven to ground, resulting in a negligible voltage at node 948. Between times t2 and t3, detection circuitry 900 returns to normal operation. Between times t3 and t4, a MIC OPEN event occurs. During the MIC OPEN event, VDETECT may go to OPEN CIRCUIT voltage, which results in MIC ACTION DETECT going HIGH. The voltage at node 948 may be higher during a MIC OPEN event than normal operation because the microphone is no longer biased by the CODEC circuitry.

Figure 11:
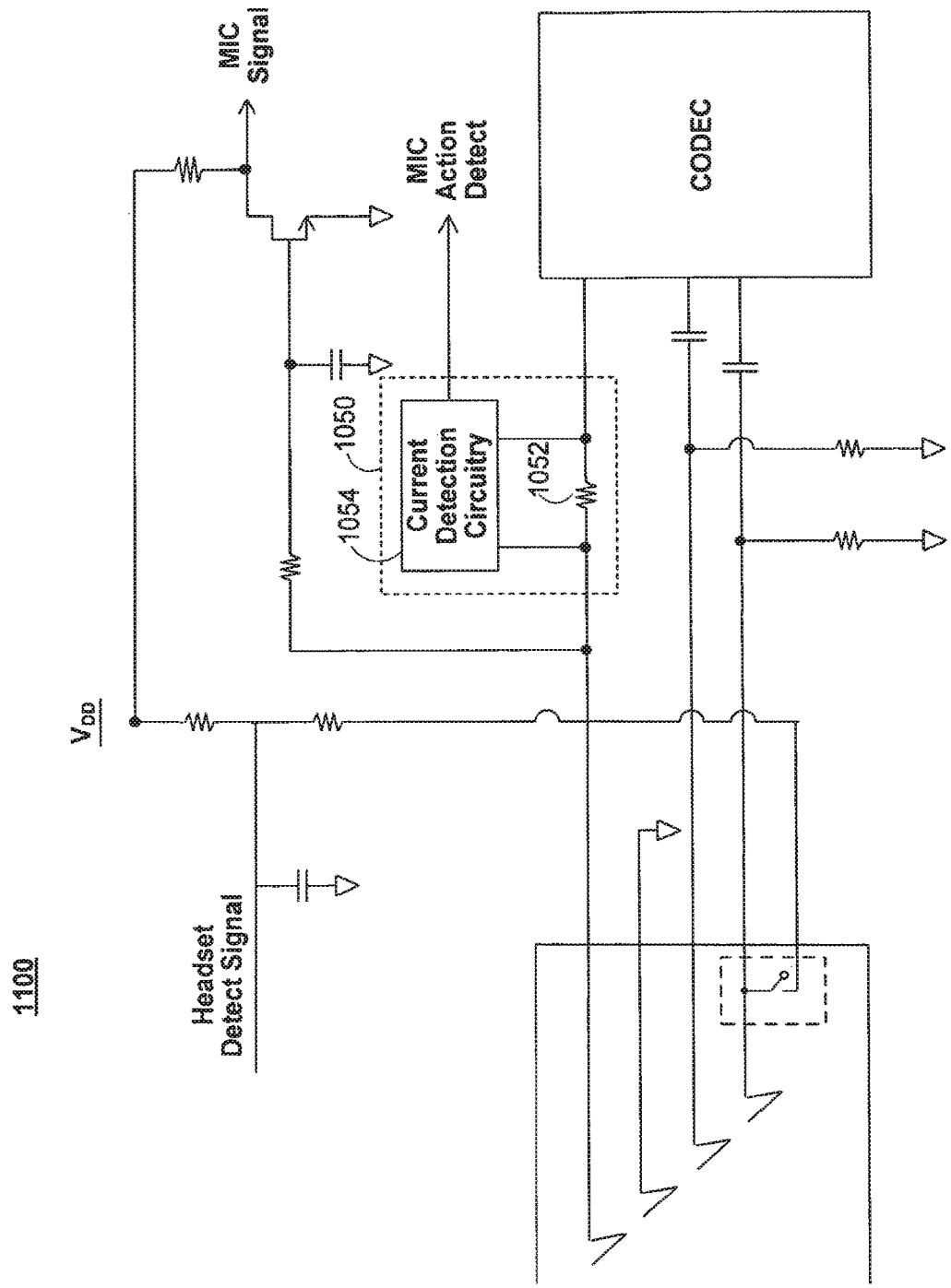
FIG. 11 shows a schematic diagram of detection circuitry including alternative secondary switch detection circuitry according to an embodiment of the present invention.

FIG. 11 shows a schematic diagram of detection circuitry 1000 including alternative secondary switch detection circuitry 1050. Detection circuitry 1000 may be the same as detection circuitry 500, therefore a detailed discussion of all the components and operation of circuitry 1000 is not needed. Secondary switch detection circuitry 1050 may include current detection circuitry 1054 for detecting a current level flowing through resistor 1052. Depending on the detected current level, circuitry 1050 may provide the appropriate signal (e.g., HIGH or LOW signal) to MIC ACTION DETECT.

In one embodiment, three different current levels may exist. A first current level may correspond to a microphone short condition (e.g. current flow may be high). A second current level may correspond to a normal microphone bias condition (e.g., current flow may be such that the microphone is biased). And a third current level may correspond to a microphone open condition (e.g., current flow may be low and the microphone is no longer biased). Current detection circuitry 1050 may assert MIC ACTION DETECT when the third current level is detected. The MIC signal may be asserted when a microphone short condition exist.

Figure 12:
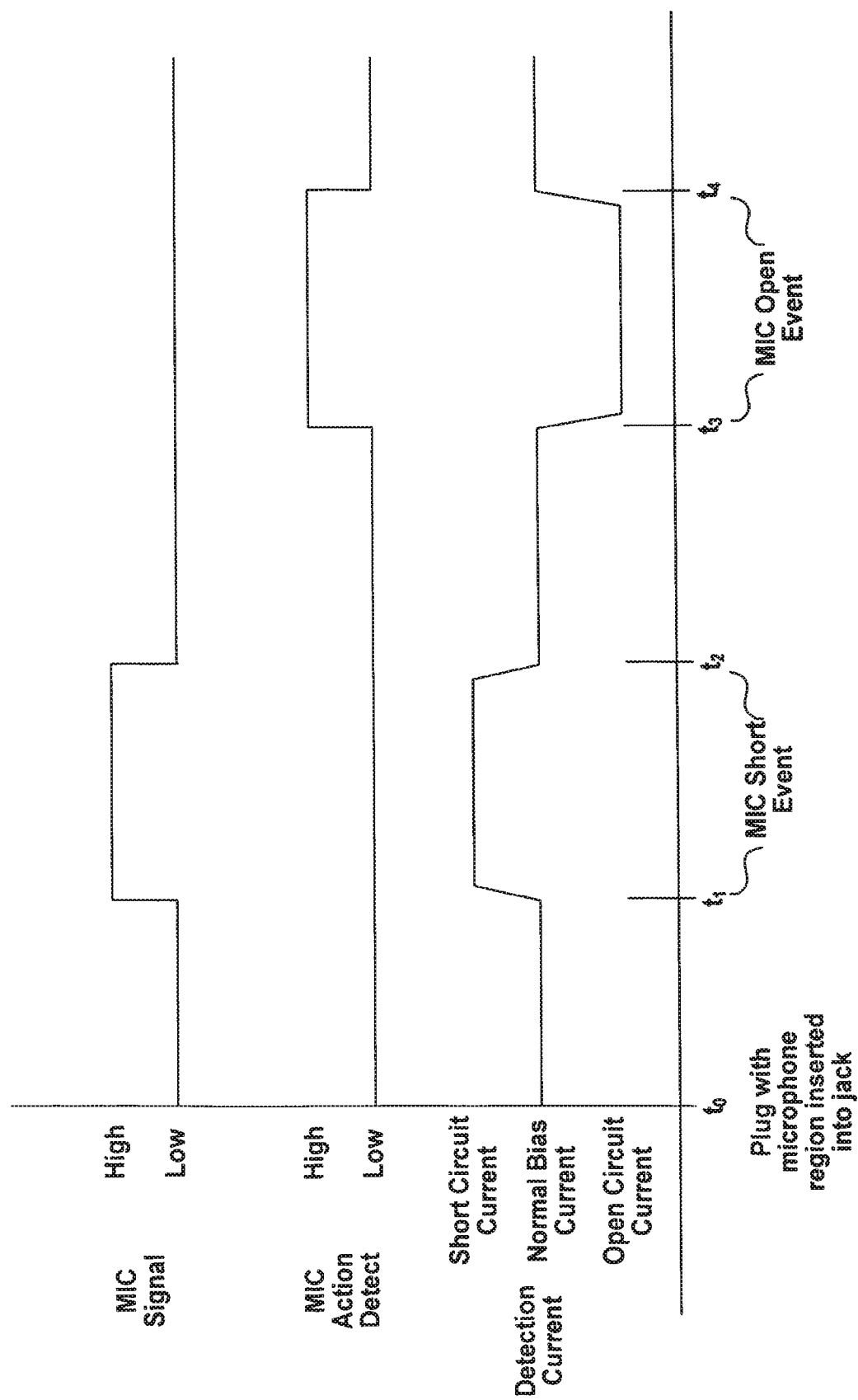
FIG. 12 shows an exemplary timing diagram illustrating assertion of signals based on detected current levels using detection circuitry operating in accordance with an embodiment of the present invention.

FIG. 12 shows an exemplary timing diagram illustrating assertion of signals based on detected current levels using detection circuitry 1100 operating in connection with a dual switch, such as those shown in FIGS. 13 and 14. FIG. 12 shows the state of the MIC and MIC ACTION DETECT signals and the current voltage detected at node 948, labeled DETECTION CURRENT. DETECTION CURRENT may range from a short circuit current to a normal bias current to an open circuit current. The normal bias current may be detected when a microphone electrically connected detection circuitry 1100 is operating in a normal mode, as indicated between times t0 and t1. Between times t1 and t2, a MIC short event occurs, which may result in MIC signal going HIGH and DETECTION CURRENT going increasing to short circuit current. Between times t3 and t4, a MIC OPEN event occurs, which may result in MIC ACTION DETECT going HIGH and DETECTION CURRENT decreasing to a open circuit current.

It is understood that although FIGS. 9-14 are discussed in terms of handling switch activation event executed by two different switches, circuitry may be provided to detect simultaneous activation of two switches and additional switches.

Figure 15:
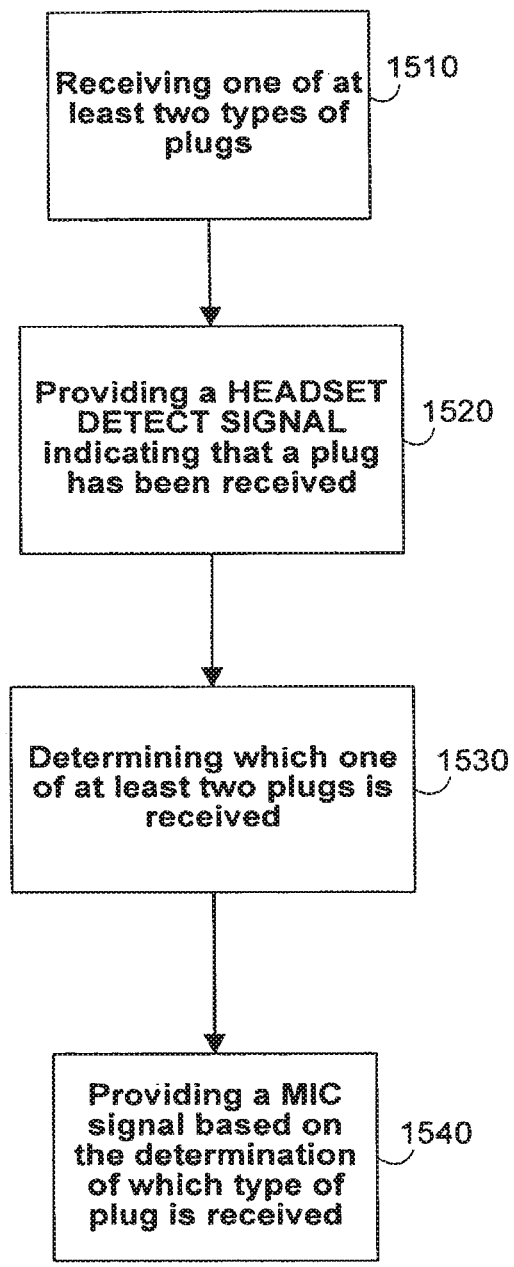
FIG. 15 is a flowchart illustrating steps that may be implemented by detection circuitry in accordance with an embodiment of the present invention.

FIG. 15 is an illustrative flowchart of various steps that may be implemented by detection circuitry. Starting at step 1510, one of at least two types of plugs is received, for example, in a jack of the detection circuitry. For example, the plug may be a four region plug including a microphone region (with a ground region located between the mic region and an audio signal region), a three region plug including a microphone region (with a ground region located between the mic region and an audio signal region), or a three region plug with no microphone region. At step 1520, a HEADSET DETECT signal may be provided (e.g., asserted) to indicate that a plug has been received. After the HEADSET DETECT signal is asserted, the bias power may be provided to bias, for example, the MIC DETECT transistor (e.g., transistor 532), if it is not already being biased.

Figure 16:
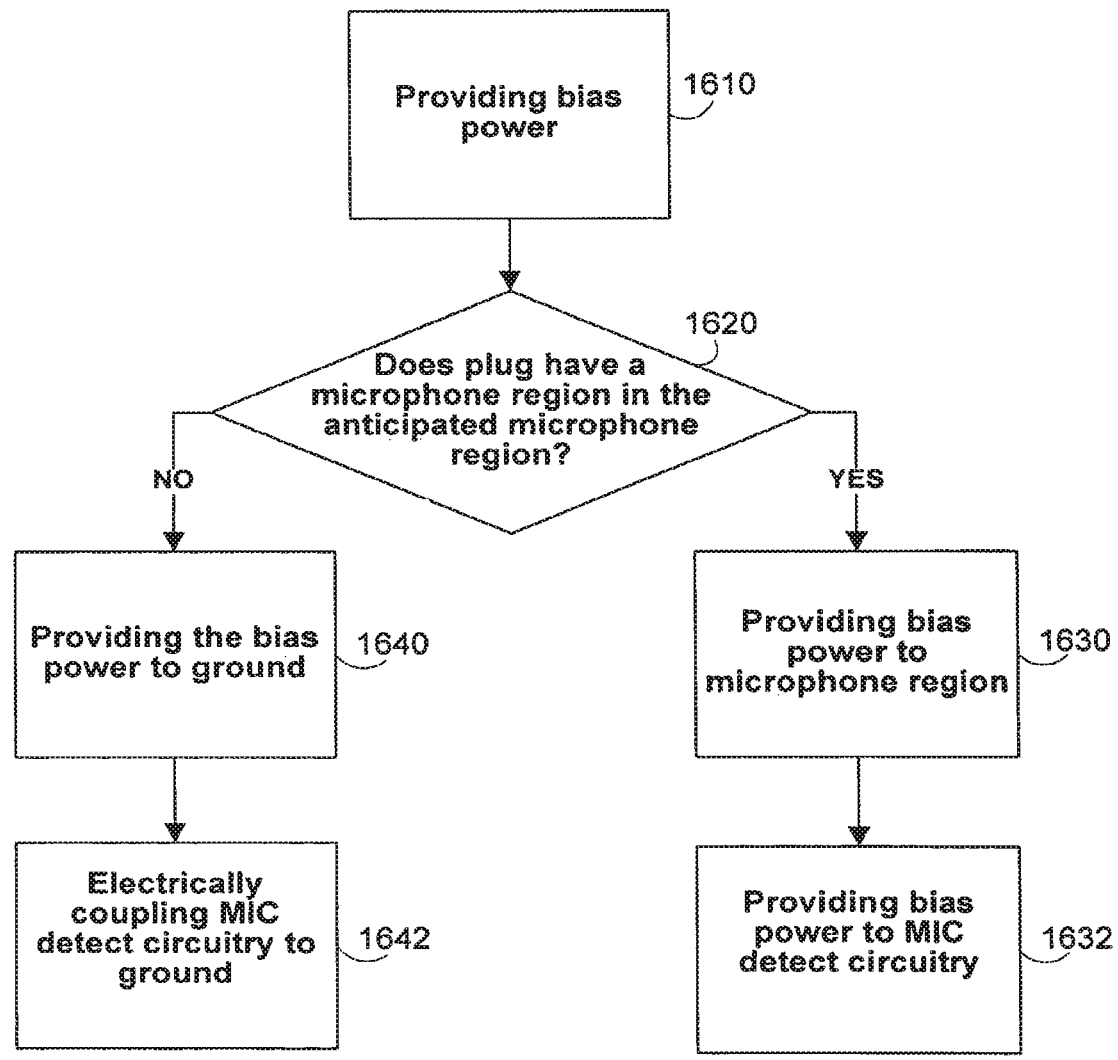
FIG. 16 is flowchart showing in more detail how one of the steps of FIG. 15 may be implemented in accordance with an embodiment of the present invention.

At step 1530, a determination is made as to which one of the at least two types of plugs is received. This determination may be made a predetermined period of time after the HEADSET DETECT signal has been asserted to provide sufficient "settling time" before making the determination. The determination may be made in one of several different ways, one of which is illustrated in the steps shown in FIG. 16. Referring to FIG. 16, at step 1610, bias power is provided. For example, bias power may be provided by CODEC circuitry. At step 1620, a determination is made as to whether the plug has a microphone region in the anticipated microphone region. If yes, the process proceeds to step 1630, which provides the bias power to the microphone region. At step 1632 the bias power is provided to MIC detect circuitry. If no, the process proceeds to step 1640, which provides the bias power to ground. At step 1642, MIC detect circuitry is electrically coupled to ground.

Referring back to FIG. 15, after the determination is made at step 1530, the appropriate MIC signal is provided at step 1540. For example, if a microphone region is detected, the MIC signal may be LOW, and HIGH if not detected. If a microphone region is not detected, then the MIC DETECT transistor (e.g., transistor 532) may be turned OFF to save power. MIC DETECT transistor may be turned by ceasing the supply of the bias power.

Figure 17:
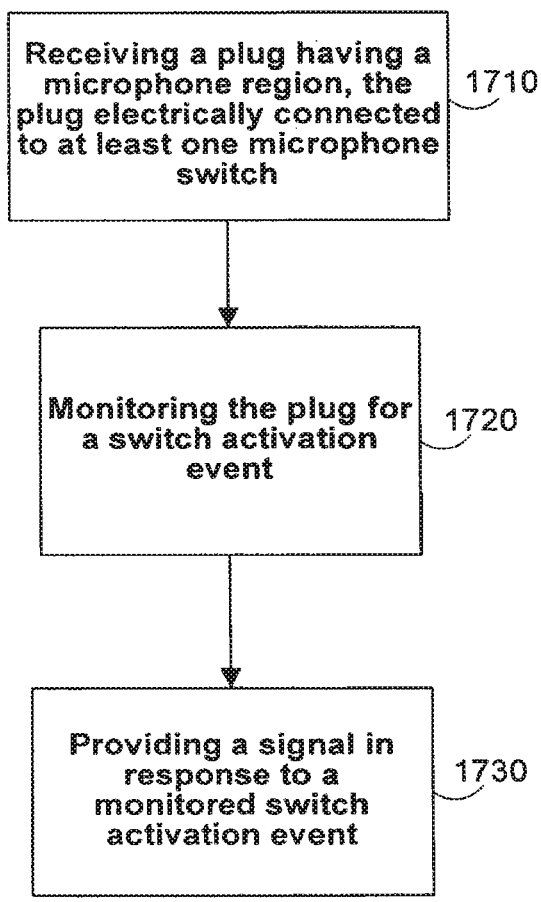
FIG. 17 is a flowchart of steps that may be taken when one or more switch activation events are detected in accordance with an embodiment of the present invention.

FIG. 17 is an illustrative flowchart of various steps that may be taken when one or more switch activation events are detected in accordance with the principles of the present invention. Starting at step 1710, a plug having a microphone region and is electrically connected to at least one microphone switch is received. For example, the plug may be electronically connected to a single or dual switch headset. At step 1720, the plug may be monitored for a switch activation event. If the headset has two switches, switch activation event caused by both switches may be monitored.

For example, one switch may cause an OPEN MIC switch activation event and the other switch may cause a MIC short circuit activation event when activated (e.g. pressed by the user). At step 1730, a signal is provided in response to a monitored switch activation event. For example, if a single switch headset is connected to the detection circuitry and is activated, the MIC signal may be asserted (for at least the duration of the switch activation event).

It is understood that the steps shown in FIGS. 15-17 are merely illustrative and that steps may be modified, added, or omitted.

Thus it is seen that plug with microphone regions and systems and methods detecting such plugs and switch activation events are provided. Those skilled in the art will appreciate that the invention can be practiced by other than the described embodiments, which are presented for purposes of illustration rather than of limitation, and the invention is limited only by the claims which follow.

What is claimed is:

1. A system comprising:
   a jack configured to receive a plug of a device, wherein the jack includes at least four connectors;
   CODEC circuitry comprising a bias voltage source;
   device detection circuitry coupled to one of the at least four connectors and to the CODEC circuitry, wherein the device detection circuitry comprises a transistor having a control node and an output node, a device type signal to be produced at the output node, the device type signal having a first state indicating a first type of device received by the jack, and a second state indicating a second type of device received by the jack, and said one of the connectors being coupled i) to the bias voltage source through a first resistor and ii) to the control node of the transistor through a second resistor; and
   one or more processors coupled to the device detection circuitry, wherein the one or more processors are configured to receive the device type signal from the device detection circuitry, and determine the type of the device based on the first state or the second state of the device type signal.

2. The system of claim 1, wherein the CODEC circuitry is configured to generate a bias voltage by the bias voltage source when the plug is received in the jack.

3. The system of claim 2, wherein the CODEC circuitry is configured to not generate the bias voltage when the plug is not received in the jack.

4. The system of claim 2, wherein the device is a headset, and wherein the device type signal is indicative of whether the headset is a microphone type headset or a non-microphone type headset.

5. The system of claim 2, wherein the one or more processors check the state of the device type signal at a predetermined time after the plug is received in the jack, and wherein the one or more processors are configured to determine the type of the device based on the checked state.

6. The system of claim 1, wherein the jack includes the device detection circuitry.

7. The system of claim 6, wherein the bias voltage source biases the transistor.

8. The system of claim 7, wherein the transistor routes the device type signal to ground when the device is a first type, and wherein the transistor routes the device type signal to the bias voltage source when the device is a second type.

9. A method for detecting which type of device is plugged in, the method comprising:
   providing a jack that is to receive a plug of a device, wherein the jack includes at least four contacts;
   providing a bias voltage source;
   providing an electric circuit that comprises i) a transistor having a control node and an output node, a device type signal to be produced at the output node, the device type signal having a first state indicating a first type of device, and a second state indicating a second type of device, a first resistor that couples the bias voltage source to one of the at least four contacts of the jack, and iii) a second resistor that couples said one of the at least four contacts of the jack to the control node of the transistor; and
   determining which type of device is plugged in based on the first state or the second state of the device type signal.

10. The method of claim 9 wherein providing a bias voltage source comprises
    generating a bias voltage when the plug is received by the jack, and not generating the bias voltage when the plug is not received by the jack.

11. The method of claim 10 wherein determining which type of device is plugged in comprises
    determining that the device is a microphone type headset when the device type signal is in the first state, or determining that the device is a non-microphone type headset when the device type signal is in the second state.

12. The method of claim 9 wherein determining which type of device is plugged in comprises
    determining that the device is a microphone type headset when the device type signal is in the first state, or determining that the device is a non-microphone type headset when the device type signal is in the second state.

* * * * *